United States Patent
Werner et al.

(10) Patent No.: US 10,248,412 B2
(45) Date of Patent: Apr. 2, 2019

(54) SHARING APPLICATIONS BY MODIFYING ATTRIBUTES

(71) Applicant: Microsoft Technology Licensing, LLC, Redmond, WA (US)

(72) Inventors: Kyle Anthony Werner, Seattle, WA (US); Samuel Lenz Banina, Bellevue, WA (US); Mark David Overholt, Bellevue, WA (US); Sunay Vaishnav, Bellevue, WA (US); Madhur Vishwanath Badal, Redmond, WA (US); Rajasekaran Rangarajan, Kirkland, WA (US); David James Messner, Redmond, WA (US); Anjli Chaudhry, Seattle, WA (US); Gautam Thapar, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 22 days.

(21) Appl. No.: 15/271,106

(22) Filed: Sep. 20, 2016

(65) Prior Publication Data

US 2018/0081678 A1  Mar. 22, 2018

(51) Int. Cl.
*G06F 8/70* (2018.01)
*G06F 8/71* (2018.01)
*G06F 8/75* (2018.01)
*G06F 8/61* (2018.01)
*G06F 8/76* (2018.01)

(52) U.S. Cl.
CPC ............... *G06F 8/70* (2013.01); *G06F 8/61* (2013.01); *G06F 8/71* (2013.01); *G06F 8/75* (2013.01); *G06F 8/76* (2013.01)

(58) Field of Classification Search
CPC ..... G06F 8/71; G06F 8/73; G06F 8/75; G06F 8/76
USPC .......................................................... 717/110
See application file for complete search history.

(56) References Cited

U.S. PATENT DOCUMENTS

| 6,832,226 B1 * | 12/2004 | Parker ................ G06F 17/3089 707/783 |
| 8,886,777 B2 | 11/2014 | Salsburg |
| 8,898,314 B2 | 11/2014 | Cochran |
| 9,104,738 B2 | 8/2015 | Kay et al. |
| 9,189,376 B2 | 11/2015 | Jayaraman et al. |
| 9,218,162 B1 | 12/2015 | Blume et al. |
| 9,250,887 B2 | 2/2016 | Lucovsky et al. |

(Continued)

OTHER PUBLICATIONS

"Configuring permissions on Google Cloud Platform", Published on: Aug. 23, 2015 Available at: https://cloud.google.com/docs/permissions-overview.

(Continued)

*Primary Examiner* — Li B. Zhen
*Assistant Examiner* — Zengpu Wei
(74) *Attorney, Agent, or Firm* — Workman Nydegger

(57) ABSTRACT

Sharing a bundle. A method includes identifying a bundle defined by a first user. The bundle includes a number of portions. One or more portions are configured to provide data from a data source. The method further includes identifying within the bundle one or more portions of the bundle that can be changed when the bundle is consumed by other users. The method further includes modifying the identified portions before the bundle is consumed by other users.

20 Claims, 4 Drawing Sheets

(56) References Cited

U.S. PATENT DOCUMENTS

| | | | | |
|---|---|---|---|---|
| 2004/0237081 | A1* | 11/2004 | Homiller | G06F 8/68 |
| | | | | 717/170 |
| 2010/0299586 | A1* | 11/2010 | Yoo | G06F 17/212 |
| | | | | 715/207 |
| 2013/0091557 | A1 | 4/2013 | Gurrapu | |
| 2013/0205277 | A1 | 8/2013 | Seven et al. | |
| 2014/0245271 | A1* | 8/2014 | Miller | G06F 8/423 |
| | | | | 717/146 |
| 2015/0178483 | A1* | 6/2015 | Kerber | H04W 4/001 |
| | | | | 726/30 |
| 2017/0206082 | A1* | 7/2017 | Abadi | G06F 8/72 |
| 2017/0228447 | A1* | 8/2017 | Catania | G06F 17/30572 |
| 2017/0344353 | A1* | 11/2017 | Roy-Faderman | G06F 8/61 |

OTHER PUBLICATIONS

Muchandi, Veer, "Sharing a Database across Applications", Published on: Feb. 10, 2015 Available at: https://blog.openshift.com/sharing-database-across-applications/.

"The SkyGiraffe Platform", Published on: Mar. 23, 2016 Available at: http://skygiraffe.com/products/.

Desai, Darshan, "Announcing Public Preview for PowerApps", Published on: Apr. 29, 2016 Available at: https://powerapps.microsoft.com/en-us/blog/powerapps-public-preview/.

* cited by examiner

SHARING APPLICATIONS BY MODIFYING ATTRIBUTES

BACKGROUND

Background and Relevant Art

Computers and computing systems have affected nearly every aspect of modern living. Computers are generally involved in work, recreation, healthcare, transportation, entertainment, household management, etc.

Users of a computer generally use software applications that are built by other people. Often, software applications are created by professional software developers that have a deep technical understanding of the subject matter and understand the complexity of enabling the software functionality. These software developers are experienced in many technical skills including the programming languages used, the platform the application is built on, for preventing security vulnerabilities, connecting to different applications and data sources, and managing the capabilities exposed to different users of the solution.

Users often have a limited set of software solutions to choose between. Users can choose between pre-built software solutions or custom solutions. The pre-built solutions are built for a target user group. The design for this group of users often focuses on a standardized process and solution. A benefit in this approach is that it allows many people to benefit from a single solution. On the other hand, the solutions are not optimized for a specific user's environment. Another choice is to build a custom solution, one that is designed for their specific processes. These custom solutions are not often pursued because they require a high level of technical skills, time, and expertise.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method for sharing bundles while protecting information used by the bundle that should not be shared with other users. Bundles (e.g., applications) are, in part, created by curated components (e.g., portions) that include predefined functionality. One or more portions in the bundle are able to connect to data sources external to the bundle. For those portions that have sensitive, or non-shareable information, that information is modified before the other users can use, or consume, the bundle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments herein implement a solution that allow common users to create a customized computer experience by selecting one or more curated portions (e.g., application components) into a bundle, such as in the illustrated example, an application container. The application container and included curated portions may be shared with other parties.

Note that in some cases, the curated portions will require specific information to enable the intended functionality. This information could be general information all users of the bundle can utilize or the information could be specific to a particular user (i.e. personalized information). For example, a portion may utilize a user name and password to connect to a data source that should not be shared with other users. As another example, a portion may utilize the URI or network location of a file share to get access to a spread sheet or database which can be shared.

Even though a portion may contain personalized information, the bundle can none-the-less be shared with other parties. In particular, in some embodiments, embodiments may identify the personalized information and modify the information so that when the created bundle is shared with other users, the users personalized information is not disclosed to and/or used by the other users. For example, the information may be modified so that the information can be automatically or manually updated with the other users personalized information. In another example, the first users personalized information may persist in the bundle and/or portion, but is obscured from the other users when shared.

This could be used to create a more efficient client computer system. For example, in some embodiments, such a client computer experience would be more efficient and faster than previous systems as such systems would eliminate time-consuming, user-based interrupts needed to change and/or remove values. Often, such systems require the user of the bundle or an application developer to change the specific information before sharing can occur. Some embodiments herein can eliminate that interaction and system delay by identifying and changing the appropriate values.

Figure 1:
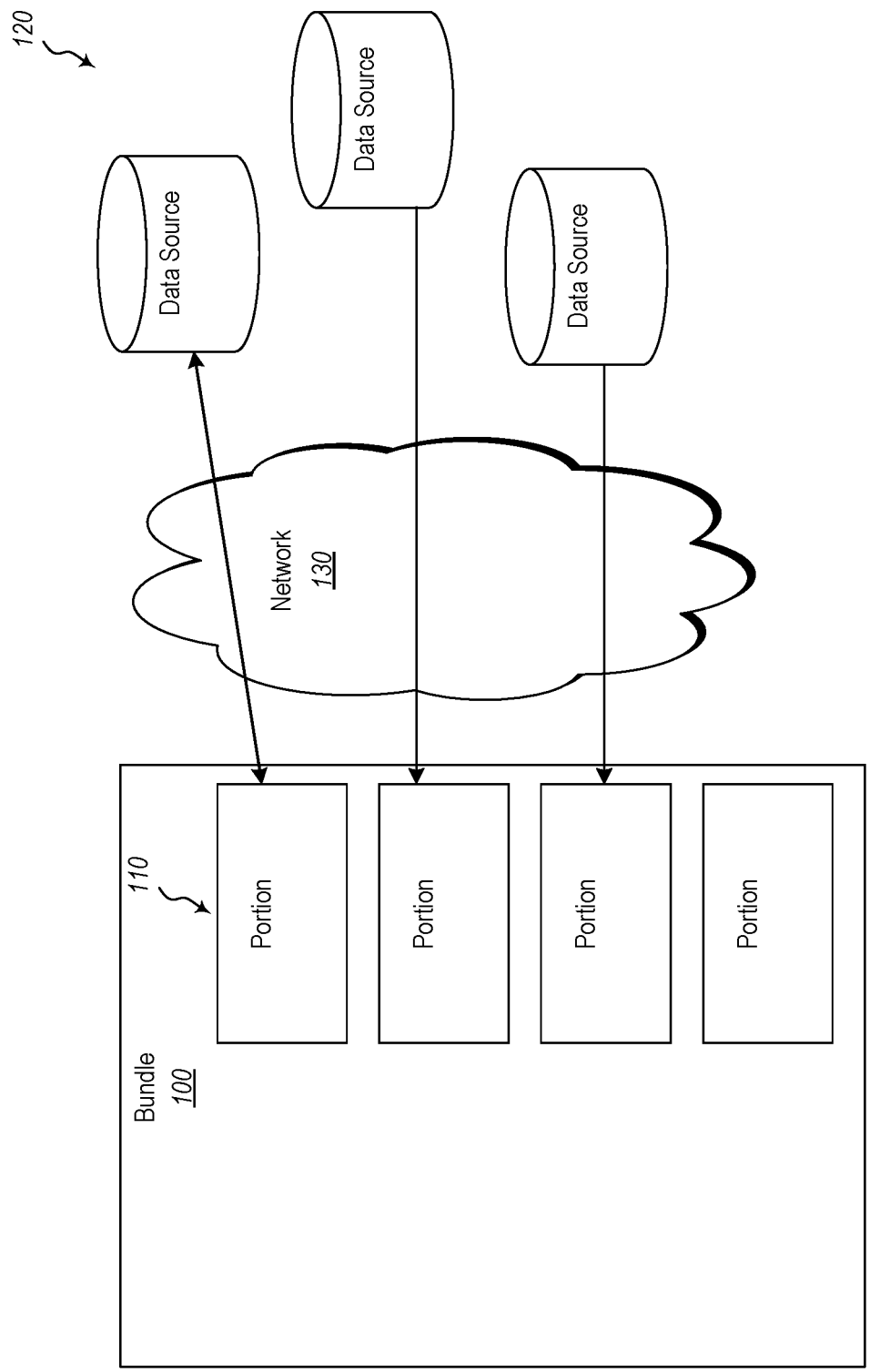
FIG. 1 illustrates a system diagram of a bundle with curated portions.

Alternatively, or additionally, this could implement a more efficient user interface. For example, a system not having the functionality illustrated herein might need to have a more complex user interface to facilitate the ability to identify which values need to be changed. Some embodiments herein can make the user interface more efficient for the user by reducing the amount of interaction that a user would need to have with the user interface to allow the system to change the non-shareable values. This would make a user interface simpler and allow a user to more efficiently interact with such an interface. FIG. 1 illustrates an example of an bundle 100 that a creator of a bundle 100, an app creator, can build or modify. In the example illustrated in FIG. 1, one or more portions 110 could be used in a bundle 100. A portion may be, for example, a sub-application that can be added to an application bundle to provide additional functionality to the application bundle. For example, a portion may be a database or spreadsheet interface. Alternatively, or additionally, a portion may be a sub-application configured to access a communication system, such as an email system or instant messaging system.

An app creator building or modifying a bundle 100 could choose one or more portions 110 to add to their bundle 100 to introduce new behaviors and/or functionality to the bundle 100. The app creator will select from one or more available portions 110.

Each portion 110 is created for a targeted runtime environment and made available to an app creator through a development environment. An app creator will select one or more portions 110 to use in a bundle 100 to enable specific behavior and/or functionality. As an example, a portion 110 could simply control how information is rendered in the bundle 100. For example, a portion could allow the app creator to choose how a user can select from a choice of options. The portion may allow the app creator to select between a drop down menu, bubble select, check mark select, etc. As another example, a portion may fetch data from a data source external to the bundle. In such an example, the connection string details may need to be configured within the portion to function properly. In some cases, the connection strings could be partially or entirely provided by the portion. In other cases, the connection string could be undefined. To illustrate these points, as an example, a portion 110 may be designed to provide a list of names in the bundle 100. The portion 110 could provide a list of people following a specific Twitter® user. In this example, the portion may include nearly all of the details necessary to connect to Twitter® except the Twitter® user's account details (i.e. the user's Twitter® username and password). If the username and password are not provided, the portion and bundle will not function properly. As another example to the list of names feature, the source of names could be undefined by the portion and the app creator would provide the location of the list and, as necessary, the appropriate access information. The location of the source could be represented as a connection string and could be a network share location, a URI on the internet, a database connection string, etc. In this example, the app creator would provide the values for the connection string and additional information needed to access the list of names.

Data Source 120 could be used to add functionality to a bundle 100. The data source 120 could be data that is external to the bundle 100. The data source 120 could be a database, an application programming interface (API), a web page, a log, an XML file, an excel file, a data service (such as email or social media), etc. In order to interact with each data source, each data source may have a predetermined permission level. Since each data source could be independent from the other data sources, the corresponding permission level for each data source could also be different. In some embodiments, a data source may need to authorize an identity before allowing access to the information available from the data source. The identity could be based on the user, metadata about the user, the device, the portion, the bundle, the IP address etc. In alternative embodiments, the data source may be publicly available and may not require an identity or any other information before allowing access to the information from the data source.

In one embodiment, the permission levels are established by the data sources and the permission levels can be set in a number of ways. As an example, the data source could set a permission level to allow read and/or write (r/w) access to the data, read only access to the data, no access to the information from the data source, set limits to the number of transactions by a requestor (e.g. 50 queries or records a day), etc. For example, user A may have r/w access to the data source and user B may have read only access. In another example, regardless of user A and user B's level of permission, both users could be limited to read only because the data source restricts interaction to read only from certain application types.

In some embodiments, a data source may include a common database table schema where new applications create new tables in a common database. In each database, the rows could be distinct for each application, but the schema is unchanged and common between bundles.

As another embodiment, a common data store could be shared by the bundles. The common data store may share configurations and metadata that is common amongst the bundles and/or portions. Alternatively, the common data store may store unique configurations and metadata from each bundle and portion in a common data store.

As an alternative example of managing data permissions, the portion 110 and/or bundle 100 could prescribe a permission level with a data source 120. This prescription may be an embedded behavior of the portion or can be edited by the app creator. For example, a portion may limit the access to a customer database to read-only access to ensure no changes are made to the data source because no changes should be required for the job task of the specific portion. Alternatively, a portion and/or an bundle may set permission levels to enable edits to an existing data source, but prevent adding new data to the same a data source.

Data sources could be running on servers managed by the company the first user is employed by (company servers), servers hosted by a company that the employer's company contracts with to manage the severs (hosted servers), available as a software as a service (SAAS), could be on the device running the bundle itself, on a peer computer, etc.

A Network 130 could connect the bundle to the data source. The network connection may occur over the internet, WAN, LAN, WiFi, cellular network, peer-to-peer network, etc. The connection could be a secured or unsecured connection.

In one embodiment, the bundle could be designed to run natively on a computing platform. For example, the bundle could execute on a Windows®, iOS®, OS X®, Android®, Linux® based computing device, Unix based computing device, or other operating system.

Figure 2:
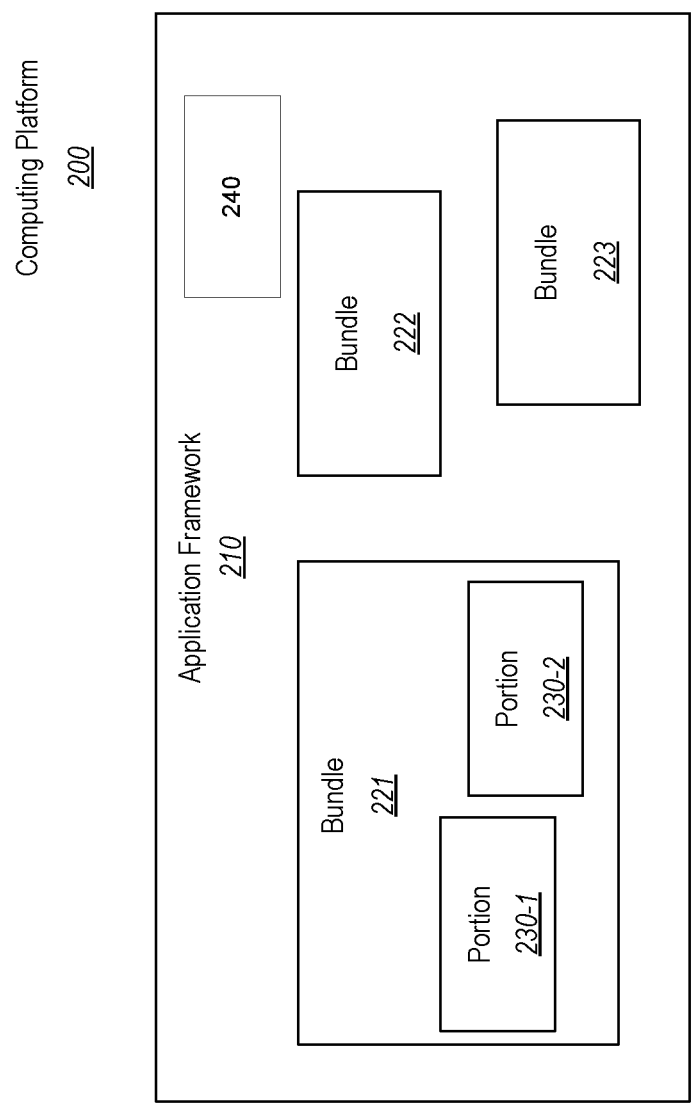
FIG. 2 illustrates a system diagram of an bundle that executes within an application framework.

FIG. 2 illustrates an embodiment of an bundle 221, 222, and 223 running in an application framework 210. The application framework 210 provides a common platform so that bundles designed to run on the application framework 210 can perform in a similar way between different computing platforms 200. For example, writing a bundle 100 to run natively on computing platforms for instance Windows®, Android®, and iOS® requires the application developer to understand each platform completely. An application framework 210 allows the bundle to be written once and the application 221 can then be used on any device or platform that can run the application framework 210. If the application framework 210 does not run on a particular platform, then the bundle, in turn, will not be usable on that platform in this example. The application framework 210 may run on a user's computer or on a server and render the bundle through a web browser, Rich Internet Application, etc. to the user.

In an embodiment, bundles running in a framework may inherit properties and/or share information between the framework, the bundle, and/or portions. For example, a common attribute that may be shared is company name. When the user provides the company name for the user's employer that value could be shared with the bundle 221, a portion 230 and/or application framework 210 that has company name as a common attribute. As an alternative example, an application framework 210 may require the username and password of a user before that user can consume any of the bundles 221, 222, 223. Once the user provides their username and password, those credentials are shared between the application framework 210, the bundles 221, 222, 223, and a portion, such as portion 230, 231 or 232 of an bundle 221.

FIG. 2 further illustrates an embodiment that includes a sharing component 240. The sharing component 240 identifies values in the bundle 221 and/or portion 230 that should be shared, may be shared, and/or should not be shared. As an example, when an bundle 221 is shared between users comprising a portion that connects to a personal Twitter® account, the username and password for the data source 120 should not be shared. The sharing component 240 may strip the username and password values from those attributes before another user consumes the shared bundle.

An alternative embodiment could be an application repository, for instance an application store, could identify the changeable portions within the bundle and the application repository could flag, change, or strip the first user's settings. In an alternative embodiment, an integrated development environment (IDE) or code repository, for instance GitHub®, could identify the changeable portions within the bundle and could flag, exchange, or strip the first user's settings for configurable settings.

Figure 3:
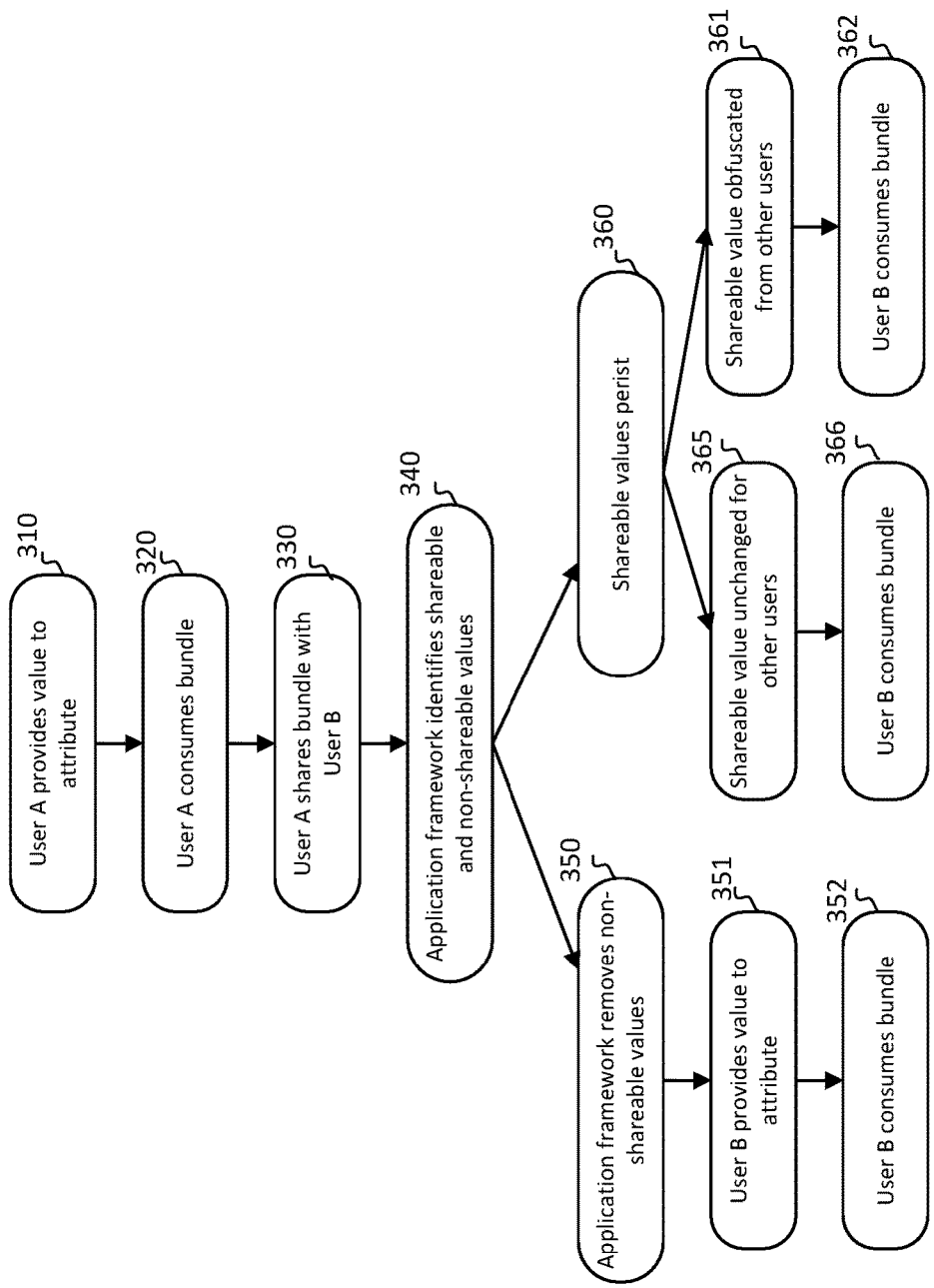
FIG. 3 illustrates a flow diagram of a process to identify and address shareable and non-shareable information in the bundle and/or portions.

FIG. 3 illustrates an embodiment for handling shareable and non-shareable values provided by the app creator and/or a subsequent user. A user of an bundle 221 may need to provide values for attributes used by an bundle and/or portion (act 310) before that user can consume the bundle (act 320). The same bundle may be shared with one or more other users (act 330). Before the bundle is consumed by the one or more other users, the application framework could identify values of attributes that are shareable and/or non-shareable (act 340). For those values that are not shareable, the application framework will remove the value (act 350). Later, when another user, a subsequent user, attempts to consume the bundle the subsequent user will need to provide the removed values (act 351). In an alternative embodiment, the original user's value will be changed with a different value. With the subsequent user's values available to the bundle, that user can consume the bundle (act 352). As an example, users may consume a bundle by using the bundle to perform an task, downloading the bundle, installing the bundle, loading the bundle, etc.

For shareable values, the application framework will not remove the values (act 360). However, the application framework may differentiate between values that can be shared directly with the subsequent user and those values that can be provided with the bundle sharing, but the values should not be shared with the subsequent user. Those values that can be shared with the bundle and do not need to be obfuscated from the subsequent user may be left unchanged by the application framework (act 361). The subsequent user is able to use the bundle with those values from the original user (act 362). An alternative type of shareable value, as an example, is a value that the shared bundle may use, but the other user should not be able to see or access that value. The shareable value is obfuscated by the application framework and/or portion (act 365). Here, the other user is able to use the bundle with those values from the original user (act 366).

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
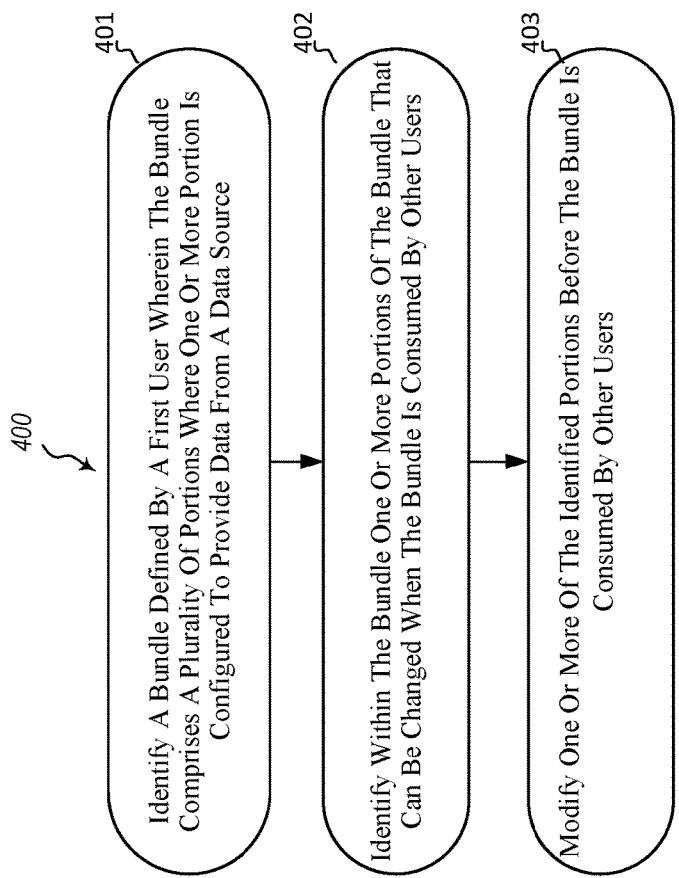
FIG. 4 illustrates a method to share bundles.

FIG. 4 illustrates a method to share an bundle between users. The method includes an bundle where a first user is able to share the bundle with one or more other users. Before other users consume the bundle, the settings and/or configurations that are set in order for the first user to consume the bundle will be potentially substituted out with other user's settings and/or configurations.

The method of 400 includes identifying a bundle used by a first user (act 401). For example, an bundle may be created, modified, or simply used by a first user. As an example, a first user could create an bundle by selecting one or more curated portions in an application framework by using drag and drop controls, or other application creation tools. In doing so, the first user will provide settings and/or configurations needed to utilize the intended functionality of the bundle and portions. Examples of such settings and/or configurations include user identity, user credentials, organization information (e.g. the user's department or company), a token, a key, restrictions enforced by the bundle, role based information, etc.

The method of 400 further includes, identifying within the bundle one or more portions of the bundle that can be changed when the bundle is consumed by other users (act 402). For example, when the first user shares the bundle with another user, the user identity of the first user in the bundle will be identified. Then when the other user consumes the shared bundle, the other user's identity is provided. Here, the identity of the first user will not be shared or exposed to the other user.

The method of 400 further includes, modifying one or more of the identified portions before the bundle is consumed by other users (act 403). For example, the values of non-shareable attributes are changed for values of the shared user before the shared user consumes the bundle. As an example, the user identify of the first user will be changed for the identity of the shared user or removed completely before the shared user consumes the bundle.

Embodiments could be implemented that differentiate between first party and third party information. As an example, when an application framework is managed and/or provided by a company that also issues, authenticates, and/or authorizes a username and password, the username and password is considered a first party to the application framework. A third party, in this example, would be where the company creating or hosting the application framework is different from the company or provider that issues, authenticates, and/or authorizes the user name and password. To illustrate this, Microsoft's PowerApps® service could require application users to be authenticated using Azure's Active Directory® credentials. In this case, Microsoft's Azure Active Directory® is a first party to the PowerApps® platform. If an application executing in PowerApps® is intended to communicate with a non-Microsoft® property (e.g. Twitter®) a Twitter® username and password is likely required. The twitter username and password is an example of third party information to the Microsoft PowerApps® service.

The method 400 may be practiced where identifying within the bundle one or more portions of the bundle that can be changed includes identifying personal information. For example, embodiments may identify personal information such as usernames, passwords, addresses, email addresses, phone numbers, demographic information, work information, personal preferences, etc. that have been entered by a user in a portion in a bundle. Embodiments identify that when personal information is provided to a portion and/or a bundle when the first user creates, modifies, or consumes the bundle, this information will likely need to change for other users if shared. Therefore, embodiments identify personal information that are included in the portion and/or bundle that can be changed when the bundle is shared with other users.

The method of 400 may be practiced where identifying within the bundle and/or one or more portions of the bundle that can be changed includes identifying restrictions enforced by the bundle. For example, embodiments may identify when data access privileges are defined by the bundle. In some cases, this could be a more restrictive privilege than a user might otherwise have to a data source. For example, restricting access to read-only when a user may actually have read and/or write (r/w) access to the data source. Therefore, the embodiments identify bundle and/or portion enforced restrictions that are included in the portion and/or bundle that can be changed when the bundle is shared with others.

The method of 400 may be practiced where identifying within the bundle or more portions of the bundle that can be changed includes identifying organizational information. For example, embodiments may identify organizational information such as company name, department names, department codes, digital keys, digital certificates, digital signatures, company network paths, etc. that have been provided directly or indirectly by a user in a portion in a bundle. Embodiments identify that when organizational information is provided to a portion and/or a bundle when the first user creates, modifies, and/or consumes the bundle, this information will likely need to change for other users if shared. Therefore, the embodiments identify organizational information that are included in the portion and/or bundle that can be changed when the bundle is shared.

The method of 400 may be practiced where identifying within the bundle or more portions of the bundle that can be changed includes identifying role based information. For example, a user may be assigned to a role as defined by the bundle, an application framework, and/or an identity based system. To illustrate this, user A could be assigned a manager role while user B may be assigned a technician role. As part of the role assignment, permissions to certain functionality could be enabled or restricted as necessary based on the assigned role. Embodiments identify that when role based information is provided to a portion and/or bundle when the first user creates, modifies, or consumes the bundle, this information will likely need to change for other users if shared. Therefore, the embodiments can identify bundle and/or portion enforced role based information that are included in the portion and/or bundle that can be changed when the bundle is shared with others.

The method of 400 may be practiced where identifying within the bundle or more portions of the bundle that can be changed includes identifying credentials to be persisted for other users, but not shared explicitly with other users. For example, when a bundle is created and/or a portion is included in a bundle, the first user may configure a data source using a specified credential with the necessary permissions to interact with the data source. However, the credentials could be intended to be used by others, but not necessarily known by others. In this case, when the bundle is shared with other users, the embodiments identify credentials to be persisted for other users to use, but not shared with other users, within a bundle and/or portion are provided when the first user creates, modifies, and/or shares the bundle, this information is obscured from other users. Therefore, the embodiments identify bundle and/or portion credentials to be persisted for other users but not shared explicitly with other users that are included in the portion and/or bundle that can be changed when the bundle is shared with others.

The method of 400 may be practiced where receiving a change to the bundle and storing the change bundle as a new version of the bundle. For example, a user could add, remove, and/or modify a portion in a bundle and share that bundle with other users. Embodiments identify that the bundle and/or a portion in the bundle has been modified and the bundle could be stored as a new version. Embodiments could make available the new version to other users where they automatically or manually consume the new version.

The method of 400 may further include identifying a roll-back version of the bundle. In some embodiments, the roll-back version could be set by each saved version. Alternatively, a user that modifies a bundle and/or portion could identify the version prior to modifications as a roll-back version. A roll-back version allows users to choose to run a different version of the bundle than the most current version that is available to the other users. Embodiments could make available roll-back versions to all users. Alternatively, roll-back versions could be made available only to the creator and/or modifier of the bundle and/or portion unless intentionally made available to other users.

The method of 400 may be practiced where a notification mechanism could inform other users when a user is creating, sharing, deleting, and/or updating a bundle and/or portion. In some embodiments, the notification mechanism can inform other users when new updates are available, when a bundle and/or portion is being modified, when a bundle and/or portion has been deleted, and/or when a bundle has been shared with other users. Embodiments identify that when a bundle and/or portion are created, shared, deleted, and/or updated, this information will likely be needed by others. Therefore, the embodiments identify changes when a bundle and/or portion are created, shared, deleted, and/or updated and notify other users.

Previously, developing applications that target specific scenarios would require custom development by a skilled application developer. The application creator would need to know how to identify and distinguish settings and/or configurations needed for each data source that the application would connect to. In addition, or alternatively, the application creator would build a sophisticated user interface to capture the personalized information. In contrast, embodiments described herein can enable a business user to develop bundles (e.g., applications) and quickly use the bundle without knowing the complexity involved around storing, exchanging, and/or validating the needed configurations and/or settings. This could allow the application developer to hide or reveal the connection string details from the user. As an example, the application framework (or app store) could flag, exchange with a configurable setting, or strip out the first user's identity. When the bundle is later consumed by the other user, the application framework, the bundle, or the portion could request the other user's identity. As another example, instead of user identity the user's organization, user preferences, device type, or any other flexible setting in the bundle can be exchanged.

The method of 400 may be practiced with bundles that are designed to run in a variety of platforms including native platform environment, an application framework, on a web server platform, a Rich Internet Application (RIA), etc.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors;
   one or more computer-readable media having stored thereon instructions that are executable by the one or more processors to configure the computer system to provide bundles of application components for different applications, including instructions that are executable to configure the computer system to perform at least the following:

at an application framework, identify a bundle comprising portions, each portion being an application component, including components from at least two different applications, and having values for attributes in the portion defined for a first user where one or more portion are configured to obtain data from one or more data sources;

at the application framework, receive a request for the bundle from a second user;

at the application framework, identify within the bundle one or more values for attributes that apply to the first user, but not to the second user;

as a result of identifying within the bundle one or more values for attributes that apply to the first user, but not to the second user, the application framework, modify the one or more values for attributes that apply to the first user, but not to the second user before the bundle is consumed by the second user, but not modifying one or more other values used to obtain data from the one or more data sources; and at the application framework provide the bundle to the second user with the modified values for attributes that apply to the first user, but not to the second user and the unmodified values used to obtain data from the one or more data sources to allow the second user to efficiently implement the application components as the bundle.

2. The system of claim 1, wherein the one or more computer-readable media further have stored thereon instructions that are executable by the one or more processors to configure the computer system to identify within the bundle values for attributes that apply to the first user, but not to the second user by identifying personal information.

3. The system of claim 1, wherein the one or more computer-readable media further have stored thereon instructions that are executable by the one or more processors to configure the computer system to identify within the bundle values for attributes that apply to the first user, but not to the second user by identifying bundle enforced restrictions.

4. The system of claim 1, wherein the one or more computer-readable media further have stored thereon instructions that are executable by the one or more processors to configure the computer system to identify within the bundle values for attributes that apply to the first user, but not to the second user by identifying organizational information.

5. The system of claim 1, wherein the one or more computer-readable media further have stored thereon instructions that are executable by the one or more processors to configure the computer system to identify within the bundle values for attributes that apply to the first user, but not to the second user by identifying role based information.

6. The system of claim 1, wherein the one or more computer-readable media further have stored thereon instructions that are executable by the one or more processors to configure the computer system to identify credentials to be persisted for other users but not shared explicitly with other users.

7. The system of claim 1, wherein the one or more computer-readable media further have stored thereon instructions that are executable by the one or more processors to configure the computer system to receive a change to the bundle and store the changed bundle as a new version of the bundle.

8. A method of providing a bundle of application components for different applications comprising:

an application framework identifying a bundle comprising portions, each portion being an application component, including components from at least two different applications, and having values for attributes in the portion defined for a first user where one or more portions are configured to obtain data from one or more data sources using at least one of the values for attributes;

the application framework receiving a request for the bundle from a second user;

the application framework identifying within the bundle one or more values for attributes that apply to the first user, but not to the second user;

as a result of identifying within the bundle one or more values for attributes that apply to the first user, but not to the second user, the application framework modifying the one or more values for attributes that apply to the first user, but not to the second user before the bundle is consumed by the second user, but not modifying one or more other values used to obtain data from the one or more data sources; and the application framework providing the bundle to the second user with the modified values for attributes that apply to the first user, but not to the second user and the unmodified values used to obtain data from the one or more data sources to allow the second user to efficiently implement the application components as the bundle.

9. The method of claim 8, wherein identifying within the bundle one or more values for attributes that apply to the first user, but not to the second user comprises identifying personal information.

10. The method of claim 8, wherein identifying within the bundle one or more values for attributes that apply to the first user, but not to the second user comprises identifying bundle enforced restrictions.

11. The method of claim 8, wherein identifying within the bundle one or more values for attributes that apply to the first user, but not to the second user comprises identifying organizational information.

12. The method of claim 8, wherein identifying within the bundle one or more values for attributes that apply to the first user, but not to the second user comprises identifying role based information.

13. The method of claim 8, further comprising identifying credentials to be persisted for other users but not shared explicitly with other users.

14. The method of claim 8, further comprising receiving a change to the bundle and storing the changed bundle as a new version of the bundle.

15. The method of claim 14, further comprising identifying roll-back versions of the bundle.

16. A computing system comprising:

one or more processors;

one or more computer-readable media having stored thereon instructions that are executable by the one or more processors to configure the computer system to implement a runtime environment configured to execute one or more bundles;

a bundle configured to execute on a runtime environment comprising one or more portions, each portion being an application component, including components from at least two different applications, and having values for attributes in the portion defined for a first user, wherein one or more portions are configured to connect to a data source external to the bundle using at least one of the values for attributes; and a sharing component configured to receive a request for the bundle from a second user; identify within the bundle one or more values for attributes that apply to the first user, but not to the second user; as a result of identifying within the bundle one or more values for attributes that apply to the first user, but not to the second user, modify the one or more values for attributes that apply to the first user, but not to the second user before the bundle is consumed by the second user, but not modify one or more other values used to obtain data from the one or more data sources; and provide the bundle to the second user with the modified values for attributes that apply to the first user, but not to the second user and the unmodified values used to obtain data from the one or more data sources to allow the second user to efficiently implement the application components as the bundle.

17. The computing system of claim 16, wherein the computing system is configured to identify within the bundle one or more values for attributes that apply to the first user, but not to the second user by identifying personal information.

18. The computing system of claim 16, wherein the computing system is configured to identify within the bundle one or more values for attributes that apply to the first user, but not to the second user by identifying bundle enforced restrictions.

19. The computing system of claim 16, wherein the computing system is configured to identify within the bundle one or more values for attributes that apply to the first user, but not to the second user by identifying organizational information.

20. The computing system of claim 16, wherein the computing system is configured to identify within the bundle one or more values for attributes that apply to the first user, but not to the second user by identifying role based information.

* * * * *